(12) United States Patent
Arroyo et al.

(10) Patent No.: US 6,748,493 B1
(45) Date of Patent: Jun. 8, 2004

(54) METHOD AND APPARATUS FOR MANAGING MEMORY OPERATIONS IN A DATA PROCESSING SYSTEM USING A STORE BUFFER

(75) Inventors: Ronald Xavier Arroyo, Austin, TX (US); William E. Burky, Austin, TX (US); Jody Bern Joyner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 09/201,214

(22) Filed: Nov. 30, 1998

(51) Int. Cl.$^7$ ................................................. G06F 13/00
(52) U.S. Cl. ....................................... 711/130; 711/147
(58) Field of Search ................................. 711/120, 121, 711/122, 130, 147

(56) References Cited

U.S. PATENT DOCUMENTS

| | | |
|---|---|---|
| 4,631,668 A | 12/1986 | Kubo et al. |
| 4,742,446 A | 5/1988 | Morioka et al. |
| 5,201,052 A | 4/1993 | Ohshima |
| 5,265,233 A | 11/1993 | Frailong et al. |
| 5,440,757 A | 8/1995 | Yoshida |
| 5,459,842 A | 10/1995 | Begun et al. |
| 5,465,336 A | 11/1995 | Imai et al. |
| 5,584,013 A | 12/1996 | Cheong et al. |
| 5,606,670 A | 2/1997 | Abramson et al. |
| 5,751,983 A | * 5/1998 | Abramson et al. .......... 712/216 |
| 6,058,472 A | * 5/2000 | Panwar et al. .............. 712/218 |

FOREIGN PATENT DOCUMENTS

EP     0 766 179     * 4/1997

OTHER PUBLICATIONS

Intel; Pentium Pro Family Developer's Manual, vol. 1:Specifications; pp. 2–7 and 2–8, 1996.*

* cited by examiner

Primary Examiner—David L. Robertson
(74) Attorney, Agent, or Firm—Volel Emile Bracewell & Patterson, L.L.P.

(57) ABSTRACT

A shared memory multiprocessor (SMP) data processing system includes a store buffer implemented in a memory controller for temporarily storing recently accessed memory data within the data processing system. The memory controller includes control logic for maintaining coherency between the memory controller's store buffer and memory. The memory controller's store buffer is configured into one or more arrays sufficiently mapped to handle I/O and CPU bandwidth requirements. The combination of the store buffer and the control logic operates as a front end within the memory controller in that all memory requests are first processed by the control logic/store buffer combination for reducing memory latency and increasing effective memory bandwidth by eliminating certain memory read and write operations.

15 Claims, 3 Drawing Sheets

METHOD AND APPARATUS FOR MANAGING MEMORY OPERATIONS IN A DATA PROCESSING SYSTEM USING A STORE BUFFER

BACKGROUND OF THE INVENTION

1. Technical Field

The present invention relates in general to a method and system for efficiently accessing memory data from a memory subsystem within a data processing system and, in particular, to a store buffer implemented in a memory controller for temporarily storing recently accessed memory data. Still more particularly, the present invention relates to the memory controller having control logic for maintaining coherency between the memory controller's store buffer and the memory subsystem in a data processing system.

2. Description of the Related Art

In shared memory multiprocessor (SMP) data processing systems, each of the multiple processors or CPU's in the system may access and modify data stored in a shared memory. In order to synchronize access to a particular granule (e.g., cache line) of memory between multiple processors, memory read operations and memory write operations are often employed. In high-speed shared memory multiprocessor data processing systems, system performance may be limited in part by the execution time of the memory read and write operations.

A memory subsystem comprises two major elements, a memory controller and a main memory. The microprocessors or CPU's, initiate bus cycles to the memory controller to obtain more instructions to execute or as a direct result of executing read and write instructions. In most systems, I/O devices also initiate DMA cycles to the memory controller to read or write memory. The memory controller is responsible for satisfying these requests and executing the memory read and write operations in a manner that facilitates a balanced system.

The memory controller must be particularly careful with CPU read operations. In general, CPU memory read operations stall CPU instruction execution until data has been read from memory and sent to the CPU. Most processors will implement L1 and L2 caches (auxiliary memory that provides capability through which a relatively slow main memory can interface with a CPU) in order to reduce the memory read latency. These caches can provide read data to the processing core of the microprocessors in an expeditious manner for read cycles.

In summary, memory bandwidth and memory latency are becoming increasingly critical in systems due to faster CPU operating frequencies and systems that support multiple CPUs. Moreover, the introduction of higher bandwidth I/O bus architectures such as PCI 66 MHz (Peripheral Component Interconnect) and AGP (Accelerated Graphics Port) has started to impact the CPU to memory bandwidth. These factors combined place a tremendous burden on the memory controller to supply memory data to the CPUs fast enough to keep them from stalling. Although, L1 and L2 caches are common in most system designs today which help relieve this burden on the memory controller, they do not address impacts to the memory bandwidth from direct memory access (DMA) operations and multi-processor cache-to-cache operations and multi-processor cache-to-cache communications. Therefore a need exists for a method to minimize impacts from DMA memory operations on CPU memory bandwidth, reduce latency for memory operations, and provide more efficient cache-to-cache transfers. The subject invention herein solves all these problems in a new and unique manner which has not been part of the art previously.

SUMMARY OF THE INVENTION

It is therefore one object of the present invention to provide a method and system for efficiently accessing memory data from a memory subsystem within a data processing or information handling system.

It is another object of the present invention to provide a method and system for minimizing impacts from DMA memory operations on CPU memory bandwidth and reduce latency for memory operations within a data processing or information handling system.

It is yet another object of the present invention to provide a method and system for providing more efficient cache-to-cache transfers and correct single bit errors that may occur during memory operations within a data processing or information handling system.

The foregoing objects are achieved as is now described. A store buffer is implemented in a memory controller for temporarily storing recently accessed memory data within a data processing system. The memory controller includes control logic for maintaining coherency between the memory controller's store buffer and memory. The memory controller's store buffer is configured into one or more arrays sufficiently mapped to handle I/O bandwidth and CPU bandwidth requirements. The combination of the store buffer and the control logic operates as a front end to the memory controller in that all memory requests are first processed by the control logic/store buffer combination for reducing memory latency and increasing effective memory bandwidth by eliminating certain memory read and write operations.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention may be executed in a variety of computer systems under a number of different operating systems or information handling systems. In addition, the computer system may be a stand-alone system or part of a network such as a local-area network (LAN) or a wide-area network (WAN).

Figure 1:
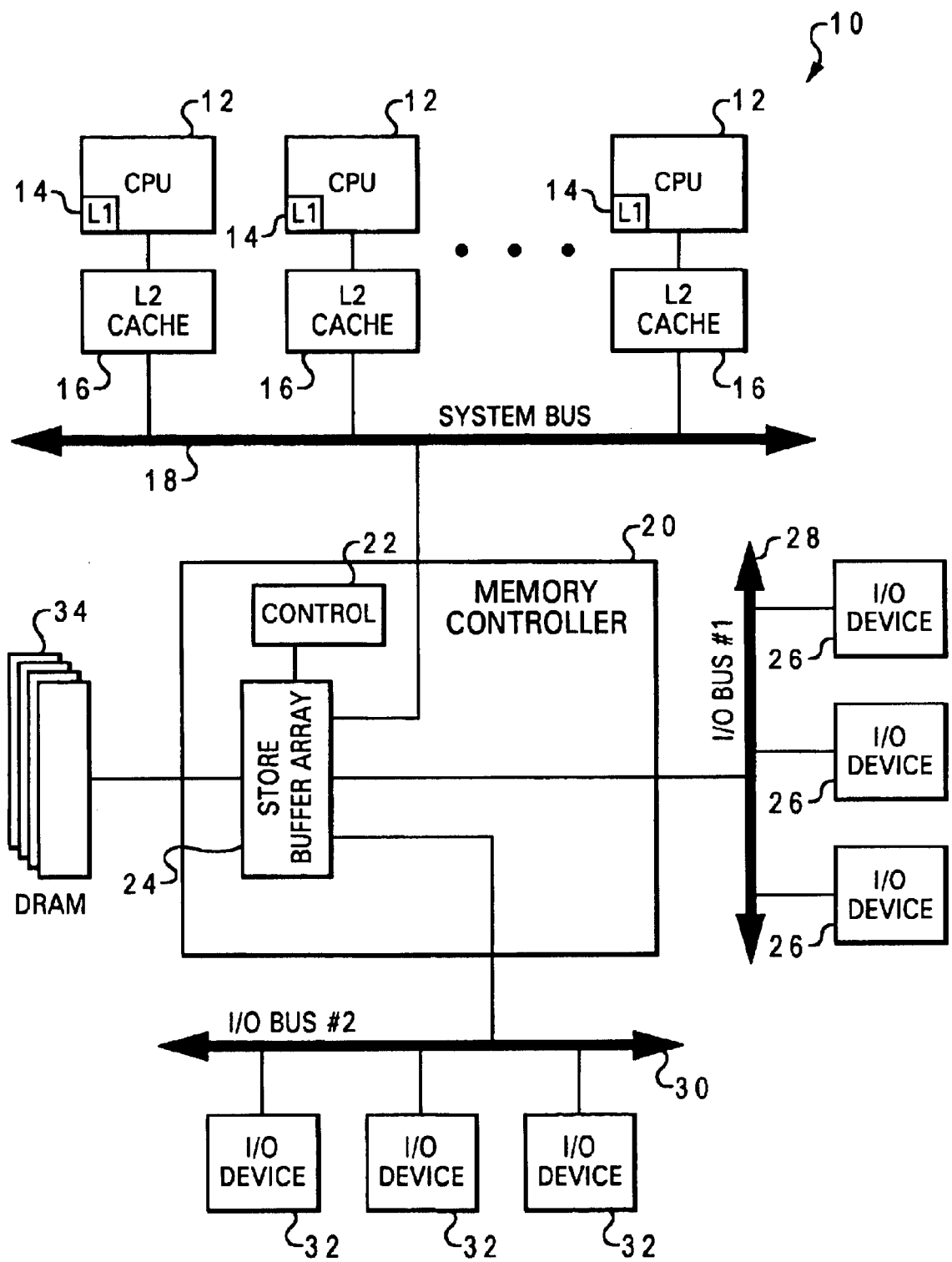
FIG. 1 depicts a system block diagram of a shared memory multiprocessor data processing system or information handling system in accordance with the present invention.

Referring now to the drawings and in particular to FIG. 1, there is depicted a system block diagram of a typical symmetrical multi-processing system 10 having L1 and L2 cache memory, 14 and 16 respectively, which may be utilized in conjunction with a preferred embodiment of the present invention. As shown, multiple central processing units (CPUs) 12 are connected to system DRAM 34 (main memory) via a memory controller 20 and system bus 18. The multiple central processing units (CPUs) 12 are further connected to other I/O hardware devices 26 and 32, via I/O bus 28 and I/O bus 30. These other I/O hardware devices, although not shown, include, for example, a keyboard, display, mouse, joystick, or the like.

Referring once again to FIG. 1, a store buffer 24 is implemented in the memory controller 20 to temporarily store the most recently accessed memory data. In accordance with the present invention, the store buffer 24 is more than a conventional store buffer (cache memory) in that control logic 22 maintains coherency between the store buffer 24 and main memory or DRAM 34. By way of example, but not of limitation, the store buffer 24 may be configured in one or more arrays with the size dependent on several factors that include the expected I/O and CPU bandwidth requirements and the desired performance and technology limitations. In the preferred embodiment, the store buffer array 24 is fully associative mapped such that any address can go into any store buffer array 24 location. The combination control logic 22 and store buffer 24 maintain coherency on a cache line basis and for purposes of the present invention it is assumed that the cache line size is 32 bytes and the number of cache lines stored in the store buffer array 24 is 16.

The combination of the store buffer array 24 and control logic 22 operates as a front end to the memory controller 20 in that all memory requests are first processed by the control logic 22. The control logic 22 places memory read data and posts memory write data into the store buffer 24 array for all read/write operations. Furthermore, the control logic 22 maintains a coherency state for each cache line in the store buffer array 24. The coherency state basically indicates whether the store buffer array 24 has more recent data than what is stored in main memory and whether the store buffer array 24 has an exclusive copy of the data. The combination of the control logic 22 and associated store buffer array 24 in the memory controller 20 reduces memory latency and increases effective memory bandwidth by eliminating certain memory reads and writes as will be more fully explained below with reference to FIGS. 2 and 3.

Figure 2:
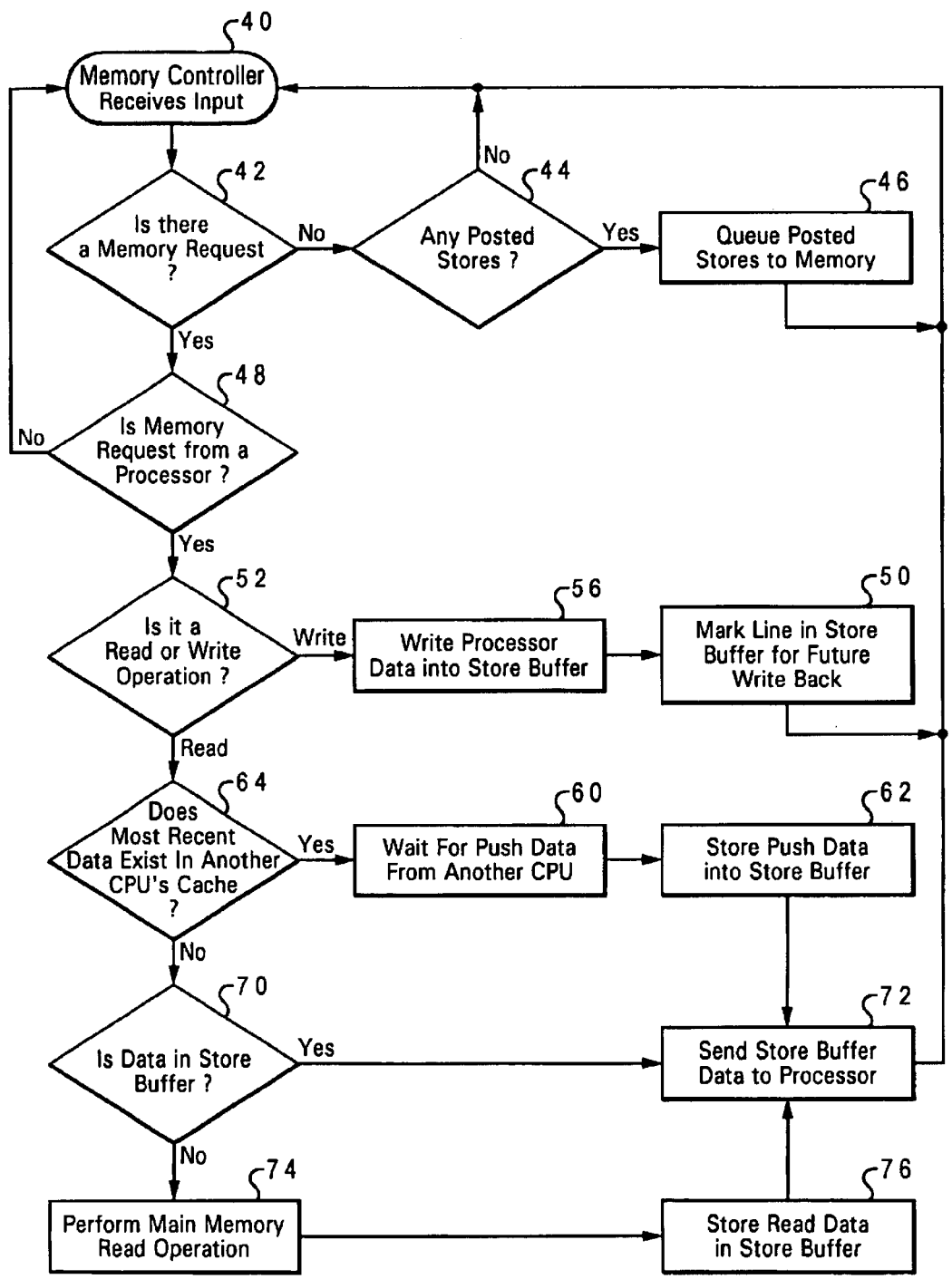
FIG. 2 is a high level logic flowchart of a method for accessing memory requests from a processor in accordance with the teachings of the present invention.

With reference now to FIG. 2, there is illustrated a high level logic flowchart of a method for accessing memory requests from a processor or CPU 12 utilizing the combination of the store buffer array 24 and control logic 22 in accordance with the teachings of the present invention. Starting at step 40, the memory controller 20 receives input off the system bus 18 and I/O buses 28 and 32 respectively, and as shown in step 42 determines if there is a memory request. Next, the process continues to step 48 wherein the control logic 22 determines if the memory request is from one of the processors or CPUs 12. If it is not from a processor or CPU 12, then the control logic 22 further determines if the request was from an I/O device, as will be more fully described below with reference to FIG. 3, or continues to let the memory controller 20 to receive input from the buses, as shown in step 40. If the request is from a processor or CPU 12, then the control logic 22 in step 52 determines if the memory request is a read or write operation.

It is well known in the art that latency on CPU reads is of extreme importance in order to keep a CPU from stalling. Once a CPU issues a read, the CPU is susceptible to stalling if the latency of the memory read data is relatively long. Re-ordering memory reads ahead of any previously queued memory writes (writes typically do not stall a processor) is a performance enhancement since the processor or CPU will not have to wait for a memory write to be done before the memory read is performed. The result of this re-ordering is that the latency is effectively halved. Referring once again to FIG. 2, as shown in step 64, if the memory request is a read operation, the control logic 22 determines if the requested data is stored in any other CPU's memory location. This ensures that a different CPU 12 does not have a more recent copy of the requested data in its respective cache 14 or 16. If the data is not stored in any CPU memory location, the store buffer 24 is checked for the requested data, as shown in step 70. If the data is in the store buffer 24, the data is sent to the processor as shown in step 72 and the process begins again at step 40. As shown in step 74, if the data is not in the store buffer 24 then the control logic 22 performs a main memory read operation and stores the data in the store buffer array 24 as shown in step 76. The data in the store buffer 24 is then written to the processor or CPU 12 as shown in step 72 and the process begins again at step 40.

Referring back to step 64, if another processor or CPU 12 has a more recent copy of the data in one of its caches, 14 or 16, respectively, the control logic 22 waits for the processor or CPU 12 with the most recent data (referred to as push data) to be stored into the store buffer array 24 as shown in steps 60 and 62. The data in the store buffer 24 is then sent to the processor or CPU 12 as shown in step 72 and the process goes to step 40. Referring once again to FIG. 2, if in step 52 the memory request was a write operation the data from the processor or CPU 12 is written into the store buffer and the line in the store buffer is marked for a future write back as shown in steps 56 and 50 and the process returns again to step 40. After posting (marking the line) memory write operations in step 50 from the processor or CPU into the store buffer array 24, the control logic 22 "hides" these writes to memory by waiting until memory is idle and there are no other requests outstanding. This is shown in steps 44 and 46 wherein during idle times when a memory request is not present at the memory controller 20, the posted stores to memory are written to the DRAM 34. In this way, writes are executed during memory idle times and therefore minimally impact latency for CPU reads.

In multiprocessor systems, it is common for processors or CPUs to access data that is currently cached in another processor's or CPU's cache. Depending on the system bus that is used, this data can be transferred directly to the requesting processor with some type of cache-to-cache transfer protocol. However, for several buses such as a prior art 60X bus, there is no cache-to-cache protocol and the latency for this type of transfer can be relatively long. Without a direct cache-to-cache transfer protocol, this type of transfer results in two accesses to the same address in system memory. The processor or CPU that has the data must first write it to memory and the second processor or CPU then almost immediately reads that data back from memory. The combination of the control logic 22 and store buffer array 24 in the memory controller 20 facilitates removing both a write and a read memory latency during a read operation which requires a cache to cache transfer. The second memory read access is not performed to memory but is instead satisfied out of the posted data stored in the store buffer array 24. This not only eliminates a read from memory but also significantly reduces the read latency to the CPU 12 for this type of transfer. Additionally, the combination of the control logic 22 and store buffer array 24 reduces latency by always posting memory write operations into the store buffer array 24 and queuing any memory reads ahead of writes to the memory controller 20. It should be understood that care is taken to not re-order reads ahead of writes that are to the same cache line in memory.

Figure 3:
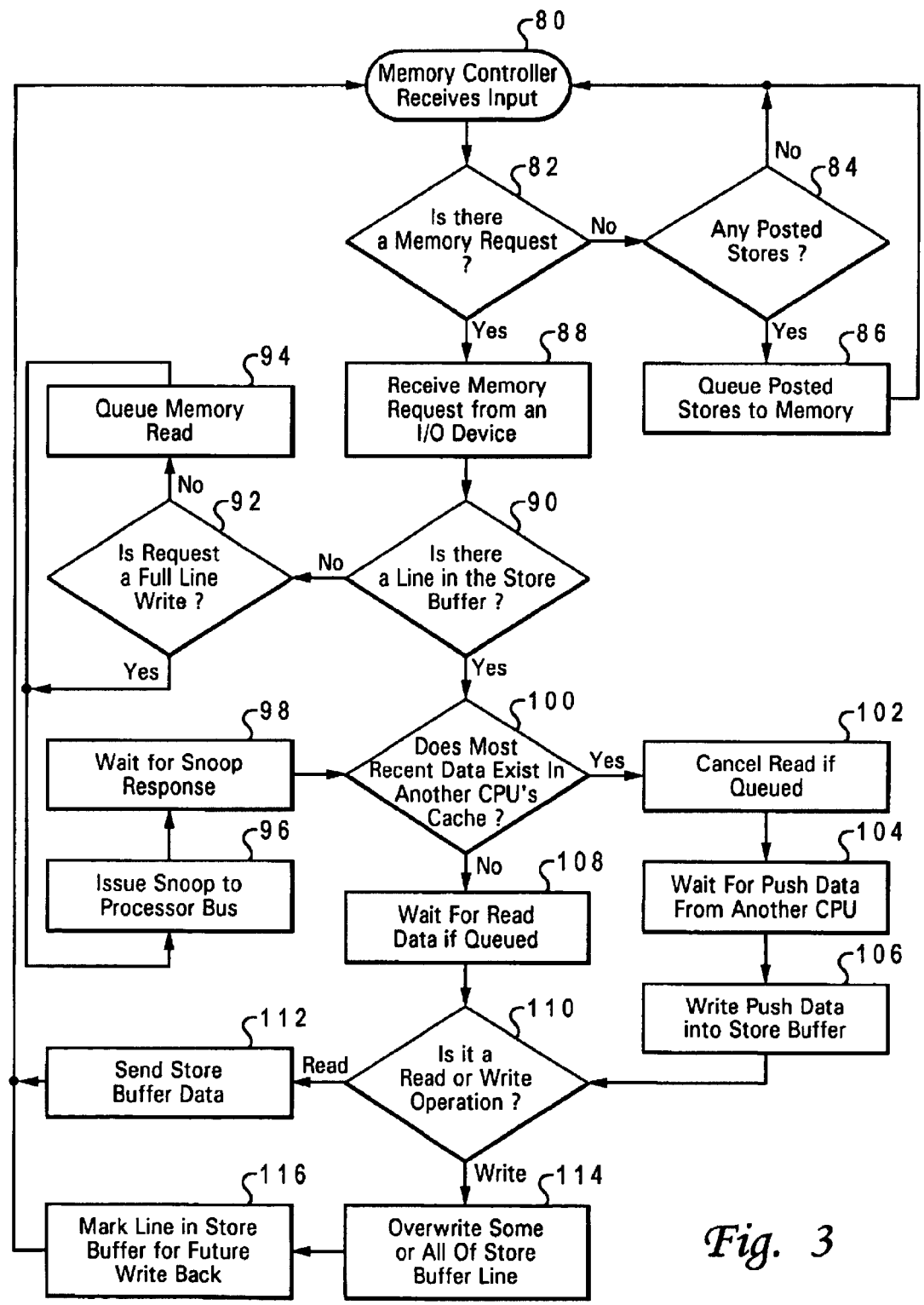
FIG. 3 is a high level logic flowchart of a method for accessing memory requests from an I/O device in accordance with the teachings of the present invention.

With reference now to FIG. 3, there is illustrated a high level logic flowchart of a method for accessing memory requests from I/O devices 26 and 32, respectively, utilizing the combination of the store buffer array 24 and control logic 22 in accordance with the teachings of the present invention. Starting at step 80, the memory controller 20 polls or receives input off the system bus 18 and I/O buses 28 and 32 and as shown in step 82 determines if there is a memory request. As shown in steps 84 and 86 and described above, during idle times when a memory request is not present at the memory controller 20, the posted stores to memory are written to the processor or CPU 12. Once again writes are executed during memory idle times and therefore minimally impact latency for CPU reads. Next, the control logic 22 determines if the memory request is from one of the I/O devices 26 or 32, respectively, as shown in step 88. If it is not from the I/O devices, 26 or 32, then the control logic 22 further determines if the request was from a processor or CPU, as was described above with reference to FIG. 2, or continues to let the memory controller 20 to poll or receive input from the buses.

The combination of the store buffer array 24 and control logic 22 may eliminate multiple I/O reads and writes to the same cache line in memory for I/O devices 26 or 32 that do not burst on the I/O bus or the length of the burst is significantly shorter than the cache line size. These devices can cause inefficiencies to occur in the memory subsystem by forcing the memory controller 20 to read the same cache line several times. This problem becomes worse for writes in systems that implement error correcting code (ECC). Small writes could force the memory controller 20 to perform several Read/Modify/Write operations to the same cache line in memory. In accordance with the present invention, the combination of the store buffer array 24 and control logic 22 may eliminate these repetitive reads and writes to memory by sourcing or sinking data from/to the store buffer array 24 after the initial read. Therefore, multiple reads and read/modify/writes per cache line will be reduced to one.

Referring once again to FIG. 3, after the control logic 22 has determined that a memory request has been received from an I/O device, 26 or 32, the control logic 22 in step 90 checks to see if there is an appropriate line in the store buffer array 24. If the line is not in the store buffer array 24, the control logic 22, as shown in step 92, next checks to see if the request is a full line write. If it is not a full line write then the memory request is queued as a memory read and a snoop command is issued to the processors or CPUs 12, as shown in steps 94 and 96. However, if in step 92, the request is a full line write, the snoop command shown in step 96 is then issued to the processors or CPUs 12. The process then proceeds to step 98 wherein the control logic waits for the snoop response. The control logic 22 eliminates multiple reads to the same cache line in memory for I/O devices that poll system memory waiting for a control block to execute. Similar to the small sequential memory accesses described above, these devices can cause inefficiencies to occur in the memory subsystem by forcing the memory controller 20 to read the same cache line several times. Therefore the combination of control logic 22 and store buffer array 24 eliminates these repetitive reads from memory by sourcing data out of the store buffer array 24 after the initial read from memory.

Referring once again to FIG. 3, when in step 98 the snoop response is received, the process proceeds to step 100 and the CPU's are checked to ensure that a different CPU 12 does not have a more recent copy of the requested data in its respective caches, 14 or 16 respectively. Similarly, if there is the requested line in the store buffer array 24 the CPU's are also checked as shown in step 100. If another processor or CPU 12 has a more recent copy of the data in one of its caches, 14 or 16 respectively, the process proceeds to step 102 to cancel the memory read operation if it was queued in step 94 and the control logic 22 waits for the processor or CPU 12 with the most recent data or push data to be written into the store buffer array 24 as shown in steps 104 and 106. The process then proceeds to step 110 wherein the control logic 22 checks to see if the memory request is a read or write operation. If the data in step 100 is not in another CPU's 12 memory, the control logic 22 waits for the read data if queued and/or if not proceeds to step 110. If the request is a read operation, the data in the store buffer 24 is then written to the appropriate I/O device 26 or 32 as shown in step 112 and the process begins again at step 80. If the request is a write operation, the data from the processor or CPU 12 is overwritten into the store buffer and the line in the store buffer is marked for a future write back as shown in steps 114 and 116 and the process returns again to step 80. As described above and shown in steps 84 and 86, during idle times when a memory request is not present at the memory controller 20, the posted stores to memory are written to the processor or CPU 12.

In addition to eliminating multiple reads and writes from/ to the same cache line in memory, the combination control logic 22 and store buffer array 24 also eliminates snoop operations on the system bus 18 in some system architectures. In system architectures where an I/O bridge (not shown) is located below the memory controller 20 (i.e. the I/O bridge does not present reads and writes to memory on the same bus as the CPUs), the memory controller 20 must present I/O addresses on the system bus 18 in order to enforce the coherency between memory and the CPU's caches. The control logic 22 of the present invention may perform this I/O snoop the first time that a cache line is placed in the store buffer array 24. The control logic 22 then monitors or snoops all CPU bus traffic looking for a transaction that changes the coherency state of the cache line. If there are no changes, the control logic 22 will not re-present an I/O address on the system bus 18 for subsequent accesses to cache lines in the store buffer array 24. It should be understood that this methodology helps to reduce address bus traffic on the system bus 18.

Additionally, the methodology described above becomes particularly useful when there is significant pre-fetching of data from system memory 34 by an I/O bridge (not shown) and due to arbitration or other reasons the data is regularly flushed out of the I/O bridge before it is used. If several lines are prefetched from memory and placed in the I/O bridge's buffers, and due to arbitration or other reasons, the I/O device does not sink all of the prefetched data, the I/O bridge will flush its buffers and begin a new I/O transfer for a second I/O device. Eventually, the first I/O device gets on the I/O bus to continue its transfer and I/O bridge will re-read data from memory that was previously fetched and flushed. The combination store buffer array 24 and control logic 22 eliminates this second read from memory and eliminates the snoop address presentation on the system bus 18.

Also, it is common for prior art I/O memory transfers to access data that is currently cached in a processor's cache. For system architectures where the I/O bridge is below the memory controller 20, this will result in two accesses to the same address in system memory. The CPU cache must first write the data to memory and the DMA device then almost immediately reads that same data back from memory. The present invention's methodology facilitates removing of one of these memory accesses. The second memory read access is not performed to memory but is instead satisfied out of the posted CPU data stored in the store buffer array 24. This methodology results in a significantly reduced latency for the I/O memory transfer since the I/O devices, 26 or 32 do not have to wait for the memory controller 20 to execute a write and then a read to memory.

Lastly, an additional benefit of the combination store buffer array 24 and control logic 22 is that it can easily be used to correct single bit errors in memory. When data is read from memory and a single bit error is detected, the corrected data is placed in the store buffer array 24 and is normally not marked to be written back to memory. By marking the corrected data as modified, this will insure that the cache line is written back to memory before it is replaced. This reduces the probability of a single bit ECC error growing into an uncorrectable 2-bit ECC error.

It is also important to note that although the present invention has been described in the context of a fully functional memory operations system, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for managing memory operations in a data processing system using a memory controller having a device bus interface, a memory interface and a system bus interface, said method comprising the steps of:
   receiving a memory request from a device bus interface at a memory controller having a store buffer;
   responsive to receiving said memory request, satisfying said memory request asynchronously with said memory request via a transaction on one of said system bus interface or said memory interface, utilizing said store buffer to schedule said transaction by transferring a processor's cache data to a device coupled to said device bus by reading said processor's cache data posted in one or more arrays within said memory controller.

2. The method according to claim 1, wherein said step of utilizing schedules said memory request by queuing said memory read operations ahead of said memory write operations that are not to a same cache line in memory.

3. The method according to claim 1, wherein said step of utilizing schedules said memory request by writing to memory queued memory write operations in one or more arrays within said memory controller during memory idle times.

4. The method according to claim 1, wherein said step of utilizing schedules said memory request by eliminating reads and writes to memory by sourcing data from and to one or more arrays within said memory controller after an initial memory read operation.

5. The method according to claim 1, wherein said step of utilizing said store buffer further includes the step of maintaining coherency of the store buffer with processor cache memory by snooping system bus operations that indicate processor updates to processor cache memory.

6. The method according to claim 1, wherein said step of utilizing said storage buffer further includes the steps of transferring a processor's cache data to satisfy a direct memory access request from an I/O device by reading processor cache data posted in one or more arrays within said memory controller by said control logic by said I/O device.

7. The method according to claim 1, wherein said step of utilizing said storage buffer further includes the steps of detecting a single bit error during said memory read operations, placing associated corrected data in one or more arrays within said memory controller, and writing corrected data in said one or more arrays back to memory.

8. A memory controller for use within a processing system, said memory controller comprising:
   a memory interface for coupling said memory controller to a planar memory array;
   a system bus interface for coupling said memory controller to a cache memory of said processing system;
   a device bus interface for coupling said memory controller to a plurality of peripheral devices;
   a store buffer coupled to said memory interface, said system bus interface, said device bus interface and said control logic, for storing memory values while accesses to said planar memory array are pending; and
   control logic for controlling accesses among said device bus interface, said system bus interface and said memory interface wherein said control logic satisfies a read request from a device coupled to said device bus by transferring data from said store buffer that is pending in said store buffer for a transfer from said cache to said planar memory array.

9. The memory controller of claim 8, wherein said read request is a direct memory access request.

10. The memory controller of claim 8, wherein said control logic presents an address of said data on said system bus so that the device bus access is properly reflected in the coherence state of said cache.

11. The memory controller of claim 8, wherein said control logic determines whether or not said read request is for a full cache line, and if it is not for a full cache line, a memory read is queued to retrieve the remainder of the cache line.

12. The memory controller of claim 11, wherein said system bus is coupled to a plurality of caches, and wherein said queued memory read is canceled if more recent data for said cache line exists in another of said caches.

13. The memory controller of claim 8, wherein said control logic re-orders pending memory read requests ahead of memory write requests.

14. The memory controller of claim 8, wherein said system bus interface is coupled to a plurality of caches, and wherein said control logic satisfies a read request from one of said caches by transferring data from said store buffer that is pending in said store buffer for a transfer for another one of said caches.

15. The memory controller of claim 14, wherein said control logic determines if one of said caches has more a more recent data corresponding to said read request and waits until said more recent data is written to said store buffer before satisfying said read request.

* * * * *